G. FORSYTH & M. R. COUNTER.
Iron Fences.

No. 146,388. Patented Jan. 13, 1874.

Witnesses:
E. Wolff
Sedgwick

Inventor:
G. Forsyth
M. R. Counter
Per
Attorneys.

UNITED STATES PATENT OFFICE.

GEORGE FORSYTH AND MOSES R. COUNTER, OF SEAFORTH, CANADA.

IMPROVEMENT IN IRON FENCES.

Specification forming part of Letters Patent No. 146,388, dated January 13, 1874; application filed September 20, 1873.

*To all whom it may concern:*

Be it known that we, GEORGE FORSYTH and MOSES R. COUNTER, of Seaforth, in the Province of Ontario and Dominion of Canada, have invented a new and useful Improvement in Iron Fences, of which the following is a specification:

The invention will first be fully described, and then pointed out in the claim.

Figure 1:
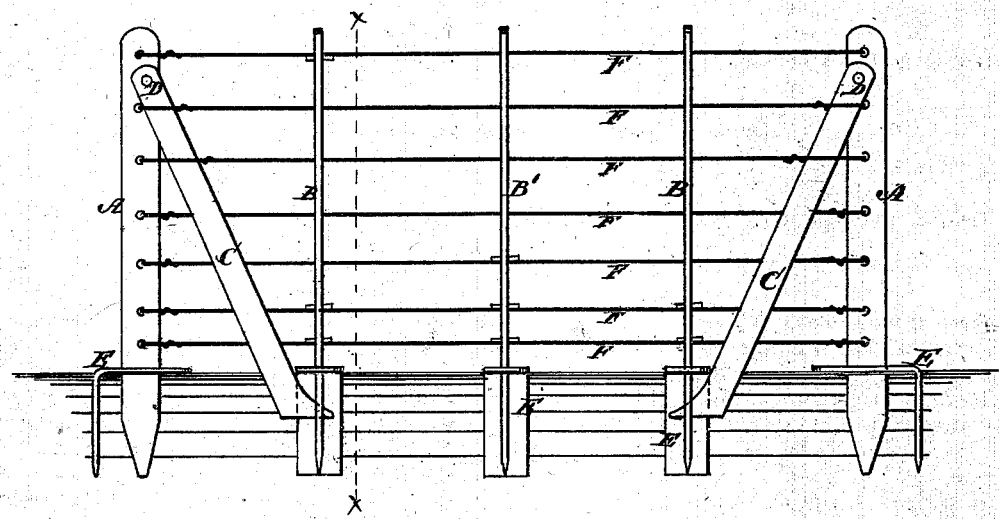
Figure 2:
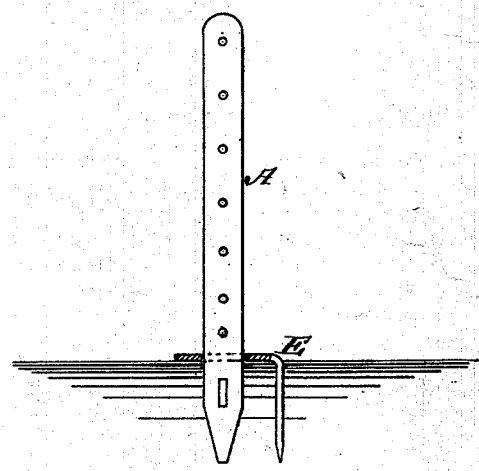

In the accompanying drawing, Figure 1 is a side elevation of a fence constructed according to our invention. Fig. 2 is a detail section, showing the application of the angle-stakes, the section being on the line $x$ $x$ of Fig. 1.

Similar letters of reference indicate corresponding parts.

This fence is composed of posts made of flat iron and wire rails, the posts being stayed at proper intervals by braces, and all being supported by angle-stakes.

A represents the posts to which the braces are attached. These include the gate-posts, and are placed at certain distances in the fence for straining the wires and rendering the fence rigid and strong. These posts are placed with their flat sides parallel with the line of fence, as seen in Fig. 1. B and B' represent the intermediate posts, which are placed with their flat sides at right angles to the line of fence. All these posts are perforated for the wire, as seen, and the wires are keyed in the intermediate posts to prevent longitudinal motion, as may be desired. C represents the braces, which are riveted or fastened to the posts A, as seen at D. They reach to the adjacent intermediate posts, and have a toe which passes through a mortise in those posts, as seen in Fig. 1. All the posts are driven into the ground a sufficient distance to render them self-supporting, but they all pass through a mortise in the angle-stakes E, which stakes are first driven into the ground, as seen in Fig. 2. This angle-stake adds very materially to the support of the fence, and counteracts the effects of the wind. F are the wire rails, which are stretched between the posts A, as seen in Fig. 1.

Having thus described our invention, we claim as new and desire to secure by Letters Patent—

The end posts A A and intermediate posts B B of a wire fence, placed in vertical planes at right angles to each other, combined with oblique braces C C, fastened near top to posts A, and having a toe passing through a slot in the lower end of posts B, as and for the purpose described.

GEO. FORSYTH.
MOSES R. COUNTER.

Witnesses:
ADAM G. McDOUGALL,
ANDREW HALLY.